UNITED STATES PATENT OFFICE.

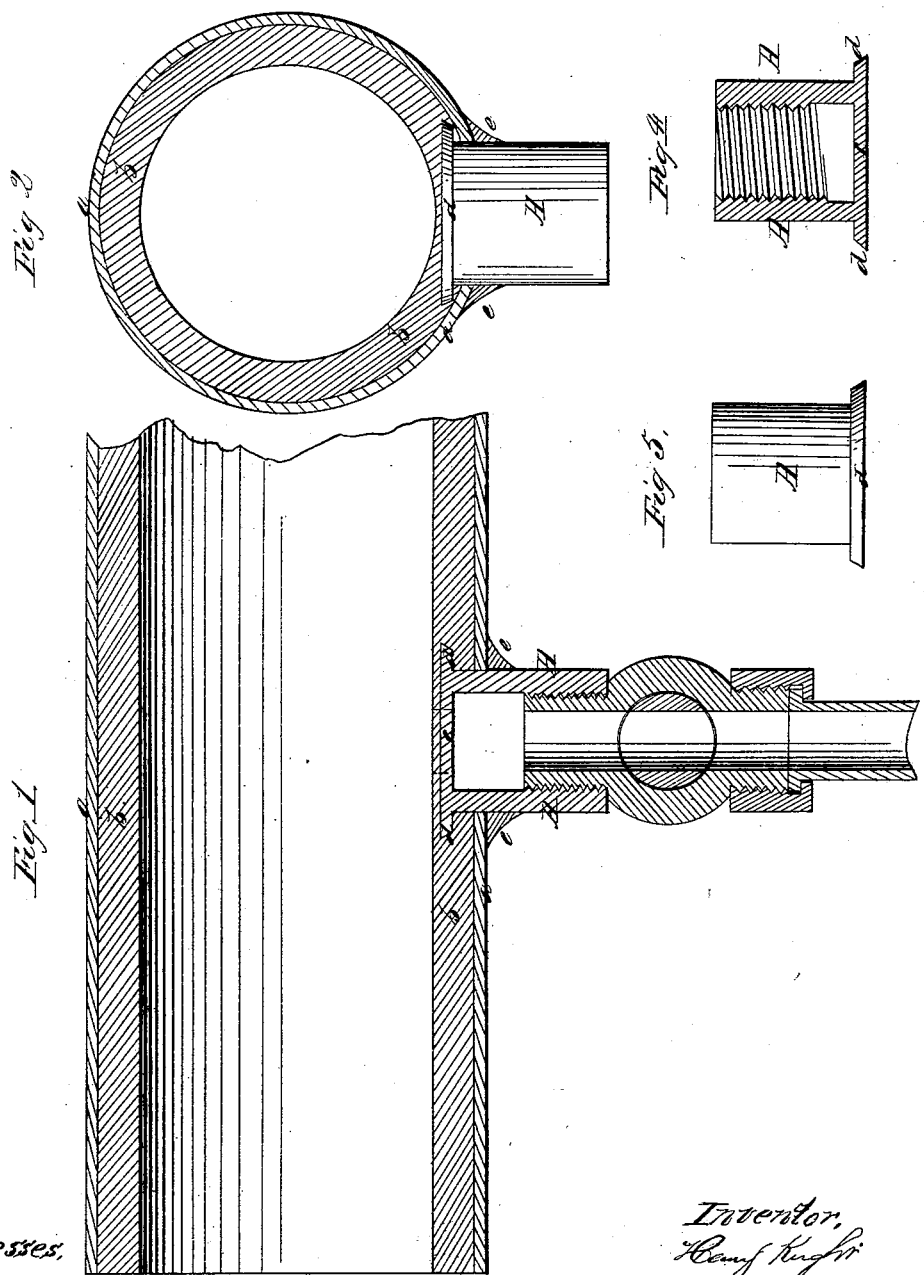

HENRY KNIGHT, OF BROOKLYN, NEW YORK.

IMPROVED TAPPING-BRANCH FOR WATER AND OTHER PIPES.

Specification forming part of Letters Patent No. 46,246, dated February 7, 1865.

*To all whom it may concern:*

Be it known that I, HENRY KNIGHT, of Brooklyn, Kings county, State of New York, have invented a new and Improved Mode of Tapping Pipes; and I do hereby declare that the following is a full, clear, and exact description thereof, reference being had to the accompanying drawings, making a part of this specification, in which—

Figure 1 is a diametrical section through a pipe prepared for tapping. Fig. 2 is a cross-section of the pipe, taken at the point where it is to be tapped. Figs. 3 and 4 show the cup-shaped tapping-connections.

Similar letters of reference indicate corresponding parts in the several figures.

This invention relates to pipes which are lined or coated on their inside surfaces with cement, and known as "combination cement and iron pipe."

The object of my invention is to successfully tap such pipes, whether they are under a head of water or not, and to make branch connections with them which shall be very strong, durable, and water-tight, and also not liable to injury from corrosion, as will be hereinafter described.

The following is a description of my mode of tapping pipes:

The character of the pipes to which I desire to apply my invention is clearly represented in Figs. 1 and 2, in which it will be seen that a thin metallic pipe, $a$, is coated on the inside with cement, $b$. Before coating or applying the cement to the metal pipe-sections, I punch holes through them at such points as it may be found necessary to make branch connections after the pipes are laid down, and through such holes I pass the hollow flanged cups A, which are constructed with one end closed, as shown at $c$, Figs. 1 and 4. These cups A are passed from the inside of the metal pipe $a$ outward, so that their flanges $d$ will form shoulders to prevent these cups from being drawn through said pipe. When the cups are adjusted snugly in their places, they are secured to the pipe $a$ by means of solder, as shown at $e\ e$, Figs. 1 and 2; or, if desired, the cups may be riveted to the pipe $a$, and the joint completed by soldering on the outside. When these cups are thus secured rigidly to the pipe $a$, it is coated on the inside with cement, as above described, and the back or closed ends of the cups firmly embedded in the cement, leaving a smooth cement surface on the inside of the pipe, as shown in Fig. 1. This mode of connecting the cups A to the pipes $a$ makes a perfectly water-tight joint, while the solder or rivets, or both solder and rivets, make a very strong and durable connection. To perforate these cups A is the work of a very few minutes, and when a head of water is on a connection may be made with the cups by means of a screw-tap, as represented in Fig. 1 in red lines, and the back end, $c$, of the cup perforated by means of a drill working through a stuffing-box.

The closed ends of the cups A are represented in the drawings as being flat, and for this reason the flanges $d$ do not fit snugly in contact with the inside of the pipe $a$; but, if desirable, the flanges of the cups may be beveled, or the closed ends of the cups so formed that they will be adapted to fit the curvature of the metallic pipe.

It may be desirable to cut screw-threads upon the inside or outside surfaces of the cups A before these cups are applied to the pipe-sections, so that branch pipes or "taps" may be quickly applied to them in localities where it would be very inconvenient to cut a thread upon them.

To prevent rapid corrosion of the cups, they may be galvanized, or a metal which will not easily corrode may be employed in their manufacture.

One great advantage which arises from the use of my invention is, that they will not become loose after being for a long time in use. The water and air are prevented from rapidly corroding the edges of the holes through which the cups are passed, as is the case in the ordinary mode of connecting short tubes to pipes.

Having described my invention, I claim—

As a new and improved article of manufacture, the flanged cup A, having one end closed, and otherwise adapted to form connections for pipes.

Witness my hand in the matter of my application for a patent on improved tapping-branch for water and other pipes this 10th day of December, 1864.

HENRY KNIGHT.

Witnesses:
 D. BRAINERD,
 CHARLES FOWLER.